United States Patent Office 3,079,257
Patented Feb. 26, 1963

3,079,257
PHOTOGRAPHIC MATERIALS CONTAINING ACRYLONITRILE COPOLYMERS AS MATTING AGENTS
Bernhard Mercher, Opladen, Günter Kolb, Koln-Stammheim, and Ingofroh Dennstedt, Koln-Buchforst, Germany, assignors to Agfa Aktiengesellschaft, Leverkusen, Germany, a corporation of Germany
No Drawing. Filed Aug. 26, 1958, Ser. No. 757,189
Claims priority, application Germany Aug. 30, 1957
4 Claims. (Cl. 96—67)

The present invention relates to photographic materials which contain organic synthetic polymers as matting agents. In order to provide a matting effect for photographic purposes, it is known to add substances such as, for example, starch, barium sulphate, silica gel and kaolin in a finely divided form to photographic layers, especially silver halide emulsion layers. These substances have the disadvantage that they settle comparatively quickly during the casting of the layers, so that the matting effect thus produced is inadequate. It has also been proposed to use finely divided cellulose as a matting agent for photographic emulsion layers. For this purpose it is, however, necessary for the cellulose or the cellulose derivatives to be brought beforehand to the required grain size by mechanical or chemical means, and comparatively tedious additional steps are necessary for this purpose. The addition of alcoholic shellac solutions to photographic emulsions has also been proposed. When this procedure is used, however, the shellac easily flocculates, so that the particle size can be kept within the desired limits only with difficulty. Dispersions of waxes have also been used for matting purposes. It has already been proposed to suspend polystyrene or polyfluorethylene in water and to add these as matting agents to the photographic layers. The use of organic substances frequently gives rise to the disadvantage that these substances do not withstand the thermal stresses produced during the drying process, especially during the high-gloss drying process of the papers. A matting agent that is adequate for all requirements, which agent provides a high matting effect and smooth surfaces when added in small proportions to the emulsion, while maintaining the deep blacks and bright whites of the photographic image, whose matting effect is not affected during the hot drying process has not heretofore been found.

It has now been discovered that the foregoing desiderata for a matting agent are largely fulfilled if, to the photographic layer are added, aqueous suspensions of synthetic resins which are obtained by polymerization of ethylenically unsaturated compounds in an aqueous dispersion in the presence of protective colloids. Those ethylenically unsaturated compounds are suitable which are capable of being polymerized in the presence of free-radical-forming catalysts, such as peroxides, and the polymers of which are insoluble in water and soften above 80° C. (the softening point being determined as described in German standard specification DIN 57,302 published by the Beuth-Vertrieb G.m.b.H., Berlin, W15).

Examples of such polymerizable ethylenically unsaturated compounds are: acrylonitrile, vinylaromatic compounds such as styrene, alkylated styrenes, esters of methacrylic acid with alcohols having 1–3 carbon atoms (methyl methacrylate, ethyl methacrylate, propylmethacrylate), vinyl esters (vinyl acetate and vinyl benzoate) polyethylenically unsaturated compounds such as divinylbenzene, and ethylene glycol dimethacrylate or copolymers of these compounds with one another or with other vinyl compounds polymerizable with free-radical-formers. Exceptions are those polymerizable compounds which contain halogen atoms. Polymers which, for example, are formed from monomeric vinyl chloride or dichloroethene are thermally unstable and thus fail to meet the high standards which are set in the photographic art. Vinyl compounds which contain fluorine, such as, for example, trifluorochloroethylene, cannot be converted by direct polymerization into aqueous suspensions such as are necessary for the production of the matting agents and photographic materials containing the same in accordance with the present invention. Aqueous suspensions prepared from polymers that have not been produced in an aqueous medium settle too quickly and impart a rough feel to the surface.

Preferred matting agents are those which are obtained by polymerization of acrylonitrile itself or by copolymerization of acrylonitrile with further ethylenically unsaturated monomers which are copolymerizable with acrylonitrile. Examples of such copolymerizable monomers are: vinylaromatic compounds such as styrene, α-methylstyrene, styrenes which are alkylated in the benzene nucleus (methylstyrenes, ethylstyrenes), esters of acrylic acid and methacrylic acid with monohydric saturated alcohols having 1–8 carbon atoms (methanol, butanol, cyclohexanol), organic vinyl esters such as vinyl acetate, vinyl propionate, and vinyl benzoate. In producing such copolymers the acrylonitrile is preferably used in amounts between 60 and 99 percent and the copolymerizable monomers in amounts between about 1 and 40 percent preferably between 1 and 20 percent by weight as calculated on the total weight of the monomers. Also of interest are copolymers which are produced from acrylonitrile, and, for example, at least one of the aforementioned copolymerizable monoolefinic monomers, and at least one further monomer which contains at least two olefinic, non-conjugated groups such as polyvinyl-aromatic compounds (divinylbenzene), diesters of dihydric saturated alcohols with alpha,beta-ethylenically unsaturated mono-carboxylic acids such as ethylene glycol methacrylate, polyesters of polycarboxylic acids and ethylenically unsaturated monohydric alcohols such as diallyl phthalate. These polyolefinic compounds are devoid of conjugated double bonds and are used in amounts of 0.01 to 25% by weight, whereas the acrylonitrile is used in amounts of 75 to 99.9% by weight when simple copolymers of said polyolefinic compounds and acrylonitrile are produced. For the preparation of copolymers containing the aforementioned three types of monomers, the acrylonitrile is preferably used in amounts of about 60 to 99% by weight, the further monoolefinic compounds are preferably used in amounts of 0.99 to 40% by weight and the polyolefinic compounds in amounts of about 0.01 to 25% by total weight as calculated on the weight of the monomers.

Examples of suitable protective colloids are: polyvinyl alcohol, partially acetylated polyvinyl alcohol, methyl cellulose, methyl hydroxypropyl cellulose, methyl starch, sodium alginate, water-soluble salts of polyacrylic acids (such as sodium and potassium salts), gelatin and the corresponding salts of copolymers of vinyl acetate and maleic acid. The proportions of the protective colloids added can vary within wide limits, but 5 to 40%, based on the weight of the added monomers, are preferably used.

If, instead of or together with these said protective colloids, there are used emulsifiers, such as sodium oleate or higher alkyl sulphonates, the structure of which is characterized by a strong hydrophilic group on a relatively long carbon chain, then latices would be obtained with a particle size too small for matting purposes. Such latices would consequently have to be added in a very high concentration to the colloid layers, which has the disadvantage that the black tones of the developed images suffer as regards saturation and the gradation is made less steep. Moreover, the conventional emulsifiers are not satisfactory photographically and have a tendency to cause fogging.

The polymerization of the aforementioned monomers can be carried out in the usual way with free-radical-forming catalysts. Suitable examples of free-radical-formers are potassium persulphate, organic peroxides, azodiisobutyric acid dinitrile or the known redox systems. The pH value of the reaction medium is preferably kept at 2 to 10 and the polymerization temperature at about 0 to 80° C.

The suspensions produced by this process contain the polymers in a particle size of about 0.1 to 5 microns. They are advantageously added in a concentration of about 5 to 40% as calculated on the weight of polymer to the aqueous solution of a layer-forming colloid, which solution serves for the production of the light-sensitive layer or a photographic auxiliary layer, especially a protective layer for the silver halide emulsion layer or a non-curling layer. The proportion of the synthetic resin suspensions added depends on the desired matting effect. It is advantageously 1.0 to 200, preferably 10 to 50 g. of synthetic resin per 100 g. of gelatin or other film-forming, hydrophilic binding agent. In addition to or instead of gelatin, other proteins or other substances which are a substitute for gelatin can be used as layer-forming colloid, it being possible for the gelatin to be wholly or partially replaced. Examples of substances which may be substituted for gelatin are cellulose derivatives, polyvinyl alcohol, polyvinyl acetates, partially hydrolyzed polyvinyl acetates, polyvinyl acetals or other synthetic or natural polymeric substances.

By the addition of very small proportions of synthetic resin suspensions when working in accordance with the invention, there are obtained a high matting effect, an extraordinarily smooth surface and deep black tones of the exposed image without the bright white tones being impaired. The above synthetic resin suspensions do not settle rapidly and therefore permit long storage of the photographic preparation. It is also surprising that the matting agents which are claimed, in contrast to the known matting agents, do not show any tendency to adsorb sensitizers or stabilizers. The matting has extremely good thermal stability and also withstands extremely high drying temperatures, such as are especially desirable when importance is attached to rapid processing.

*Example 1*

40 g. of polyvinyl alcohol are dissolved in 1200 cc. of water. 200 cc. of this solution, 0.4 g. of potassium persulphate, 0.2 g. of sodium pyrosulphite ($Na_2S_2O_5$, also known as sodium metabisulfite), 0.12 cc. of a 0.1% copper sulphate solution and 5 g. of acrylonitrile are placed in a 2-liter stirrer-type vessel and the reaction mixture is heated while stirring to 30° C. When the polymerization starts, there are simultaneously added dropwise and continuously, at 30° C. and while stirring over a period of 2 hours, 155 g. of acrylonitrile, 2.6 g. of potassium persulphate dissolved in 500 cc. of the polyvinyl alcohol solution, 1.3 g. of sodium pyrosulphite dissolved in 500 cc. of the polyvinyl alcohol solution and 0.36 cc. of 0.1% copper sulphate solution.

The mixture is stirred for one hour and, after the residual monomers have been driven off with steam, a stable non-settling polyacrylonitrile suspension is obtained. A photographic silver halide-gelatin emulsion provided with conventional casting additives has added thereto 20 to 150 cc. of the polyacrylonitrile suspension per liter of photographic emulsion, depending on the degree of matting which is desired. A photographic support (film or paper) is then coated with the resulting emulsion.

*Example 2*

35 g. of polyvinyl alcohol are dissolved in 1200 cc. of water. 200 cc. of this solution, 0.3 g. of potassium persulphate, 0.15 g. of sodium pyrosulphite and 5 g. of methyl methacrylate are placed in a 2-liter stirrer-type vessel and the reaction mixture is heated to 40° C. When the polymerization has started, the temperature is reduced to 30° C. and simultaneously 155 g. of methyl methacrylate, 1.9 g. of potassium persulphate dissolved in 500 cc. of the polyvinyl alcohol solution and 0.9 g. of sodium pyrosulphite dissolved in 500 cc. of the polyvinyl alcohol solution are added dropwise at 30° C. over a period of 2 hours while stirring.

The mixture is stirred for another hour at 30° C. and, after the residual monomers have been driven off with steam, a stable non-settling polymethyl methacrylate suspension is obtained. A photographic support is coated with a conventional photographic emulsion to each liter of which 10–150 cc. of the matting suspension has been added. As protective layer there is used a 2% aqueous gelatin solution or an aqueous solution containing another colloid, to which 20 to 100 cc. of the matting suspension has been added per liter to protective layer solution. If desired, hardening agents, such as formaldehyde and glyoxale, may be added to the coating solution.

*Example 3*

35 g. of polyvinyl alcohol are dissolved in 1200 cc. of water. 200 cc. of this solution, 0.3 g. of potassium persulphate, 0.15 g. of sodium pyrosulphite and 5 g. of a mixture of equal parts by weight of methyl methacrylate and vinyl acetate are placed in a 2-liter stirrer-type vessel and the reaction mixture is heated to 40° C.

When polymerization has started, the temperature is reduced to 30° C. and simultaneously and while stirring a mixture of 77.5 g. of methyl methacrylate and 77.5 g. of vinyl acetate, 1.8 g. of potassium persulphate dissolved in 500 cc. of the polyvinyl alcohol solution and 0.9 g. of sodium pyrosulphite dissolved in 500 cc. of the polyvinyl alcohol solution are added dropwise at 30° C. over a period of 2 hours. Stirring is continued for one hour at 30° C. and, after the residual monomers have been driven off with steam, a stable non-settling suspension of a copolymer of methyl methacrylate and vinyl acetate is obtained. The resulting aqueous suspension of the synthetic resin is used to prepare a photographic material as described in Example 1.

*Example 4*

30 g. of methyl cellulose are dissolved in 1200 cc. of water. Two hundred (200) cc. of this solution are substituted for the 200 cc. of polyvinyl alcohol solution used in Example 1 and the stable polyacrylonitrile suspension that is thus obtained can be used as described in Example 1 for matting purposes.

We claim:

1. A light-sensitive photographic material having a mat finish, which comprises a support bearing at least one layer of a silver halide emulsion and bearing at least one protective layer superimposed over one of the said emulsion layers, at least one of the two said layers having intimately distributed therethrough an amount, based on the total weight of the binder content of the said layer, between about 10 and about 50 percent by weight of discrete small particles of a copolymer of acrylonitrile and a polymerizable compound of the group consisting of methacrylic esters of lower alkanols, vinyl esters of lower aliphatic organic acids, and mixtures thereof with polymerizable nonconjugated polyolefins, the acrylonitrile content of the copolymer being at least 60 percent of the total weight of the copolymer, the particles of the said copolymer having diameters between 0.1 and 5.0 microns, and the said copolymer particles having been produced by copolymerization in an aqueous medium in the presence of a free-radical-forming catalyst and a protective colloid that is free of emulsifiers having a strongly hydrophilic group attached to a long carbon chain.

2. A light-sensitive photographic material as defined in claim 1 in which the polymer is a copolymer of 60 to 99% by weight of acrylonitrile, 0.99 to 40% by weight of a polymerizable compound of the group consisting of methacrylic esters of lower alkanols and vinyl esters of lower aliphatic organic acids, and 0.01 to 25% by weight of a polymerizable nonconjugated polyolefin.

3. A light-sensitive photographic material as defined in claim 1, the copolymer particles of which were formed from a mixture of monomers containing a methacrylic ester of a lower alkanol and acrylonitrile, the latter in an amount not less than 60 percent by weight of the mixture.

4. A light-sensitive photographic material having a mat finish, which comprises a support bearing a silver halide emulsion layer comprising a water-permeable binding agent, and bearing a protective layer of a water-permeable colloid superimposed on the said emulsion layer, the said water-permeable colloid having intimately distributed therethrough fine particles of a copolymer having a softening point above 80° C., that was produced by copolymerization of acrylonitrile with a polymerizable ethylenically unsaturated monomer of the group consisting of methacrylic esters of lower alkanols, vinyl esters of lower aliphatic acids, mixtures of these monomers with each other, and mixtures of the foregoing with a polymerizable nonconjugated polyolefin, the acrylonitrile content of the copolymer being at least 60 percent of the total weight of the copolymer, the particles of the said copolymer having been produced in the presence of a free-radical-forming catalyst in an aqueous medium containing a protective colloid that is free of emulsifiers having any strongly hydrophobic groups on a long carbon chain, the particles of the said copolymer having diameters falling within the range between 0.1 and 5 microns, and the amount of the said particles that are distributed in the layer being sufficient to impart to the emulsion a mat finish.

References Cited in the file of this patent

UNITED STATES PATENTS

| | | |
|---|---|---|
| 2,322,037 | Lindquist | June 15, 1943 |
| 2,350,032 | Hager | May 30, 1944 |
| 2,731,347 | Gray | Jan. 17, 1956 |
| 2,772,166 | Fowler | Nov. 27, 1956 |
| 2,865,753 | Griffin | Dec. 23, 1958 |

OTHER REFERENCES

Billmeyer: "Textbook of Polymer Chemistry," Interscience Publishers Inc., New York (1957), page 250.